United States Patent Office 3,351,472
Patented Nov. 7, 1967

3,351,472
HONEYBUTTER AND PROCESS OF MANUFACTURE
Roy D. Finley and Kenneth A. Hollowell, Greenville, Ill., assignors to Pet Incorporated, a corporation of Delaware
No Drawing. Filed Nov. 2, 1964, Ser. No. 408,323
13 Claims. (Cl. 99—146)

This invention relates to an improved crystallizing process for the manufacture of a spread comprising a mixture of milk ingredients, sugar solids, and flavoring, preferably honey solids. This invention also includes improved honeybutter products produced by this process.

In the conventional manufacture of honeybutter, liquid honey, or the honey which has been previously crystallized or powdered, is blended with a fat source, either animal or vegetable. Due to the crystallized honey being in either a solid or a semi-solid state, difficulties are incurred in obtaining a homogenous mixture of honey and butter and in the subsequent packaging of this product. This process produces a product of short shelf life due to rancidity formation, a product that has to be refrigerated, and one whose consistency and/or crystalline structure will change naturally or when subjected to temperature variations.

The present invention overcomes the blending and packaging difficulties which are inherent in honeybutters made by conventional commercial processes, and produces a product which has superior flavor, texture and spreadability and excellent keeping quality under refrigeration. Other benefits of this invention include a reduction in time to process, package and attain salable consistency of product.

The principal object of the present invention is to provide a honeybutter product and process in which the product has good spreadability at 40° F. and over a wide temperature range. Another principal object is to provide a process of making honeybutter using dextrose seed crystals and continuous agitation at temperatures of less than 60° F. for about 24 hours.

Still another object is to provide a product having a shelf life without rancidity development of 30 days or more without refrigeration; one whose consistency, which is similar to that of butter at 50° F., will not change substantially when subjected to a temperature range of 30° F. to 75° F.; and one which does not have the stickiness or stringiness characteristics of liquid or finely crystallized honey. This consistency results in improved spreadability of the final product which is an attribute from the point of view of the consumer. This product can be stored at temperatures of 0–50° F.

Another object of this invention is to provide an improved blending of honey, milk solids, including milk fat, and sugar solids, including dried corn syrup and dextrose, and subsequent packaging of the product with shorter crystallization times as compared to conventional processes.

A further object of this invention is to eliminate special equipment such as dehydration chambers which are necessary in certain of the present methods of manufacturing honeybutter, and to utilize standard equipment which is to be found in dairies and/or honey processing plants.

Still another object of the present invention is to provide cinnamon and other flavored honeybutter products.

Still a further object is to provide a honeybutter product incorporating honey, milk solids, including milk fat, and various sugar solids including dextrose and dried corn syrup.

Another object of the present invention is to provide a process of making honeybutter in which the honey and fat and a portion of the sugar solids are combined prior to a small amount of dextrose seed crystals being added with constant agitation at predetermined temperatures to promote crystallization.

In the present process, fluid raw honey, the dairy ingredients, the dried corn syrup and the major portion of the dextrose are pasteurized, cooled slightly, and homogenized. The mixture is cooled to below 60° F. and passed to a crystallizer where it is held at this temperature and seeded with a dextrose seed slurry and agitated for about a 24 hour period during which time crystallization occurs prior to packaging.

The invention further consists in the process hereinafter described and claimed in the honeybutter products made by said product.

Example 1

FORMULATION OF BASIC HONEYBUTTER—CINNAMON MIXTURE

| Ingredient | Comp. Percent | M.F. Percent | M.S.N.F. Percent | T.S. Percent |
|---|---|---|---|---|
| Honey (81.4% T.S.) | 67.69 | | | 55.10 |
| Conc. Milk and Cream | 11.6596 | 2.15 | 1.945 | 4.095 |
| Dried Corn Syrup | 11.30 | | | 10.792 |
| Dextrose | 8.79 | | | 8.043 |
| Cinnamon | 0.56 | | | 0.56 |
| Antioxidant (Tenox 2) | 0.0004 | | | |
| Total | 110.0300 | 2.15 | 1.945 | 78.590 |

FORMULATION OF DEXTROSE SEED MIXTURE

| Ingredient | Comp. Percent | T.S. Percent |
|---|---|---|
| Dextrose | 71.33 | 64.91 |
| Water | 28.57 | |
| Dextrose* | 99.90 | 64.91 |
|  | 0.10 | 0.09 |
| Total | 100.00 | 65.00 |

*This dextrose consists of 200 mesh screenings from the total quantity of dextrose (71.43%) required to prepare the 65% dextrose solution. The quantity of 200 mesh screenings is approximate and is saved for incorporating into the cooled dextrose solution to initiate crystallization.

BLEND OF SEED AND BASIC MIX:
[Final product is composed of 98% basic honeybutter mixture and 2% of the textrose seed mixture]

| Ingredient | Comp. Percent | M.F. Percent | M.S.N.F. Percent | T.S. Percent |
|---|---|---|---|---|
| Honey | 66.3362 | | | 53.998 |
| Conc. Milk and Cream | 11.4264 | 2.107 | 1.906 | 4.013 |
| Dried Corn Syrup | 11.074 | | | 10.576 |
| Dextrose | 8.6142 | | | 7.882 |
| Cinnamon | 0.5488 | | | 0.548 |
| Antioxidant (Tenox 2) | 0.0004 | | | |
| Sub-Total | 98.0000 | | | |
| Dextrose | 1.427 | | | 1.306 |
| Water | 0.571 | | | |
| Dextrose (200 mesh) | 1.998 | | | 0.002 |
|  | 0.002 | | | |
| Sub-Total | 2.000 | | | |
| Total | 100.0000 | 2.107 | 1.906 | 78.325 |

FINAL COMPOSITION OF HONEYBUTTER-CINNAMON

| Ingredient | Comp. Percent | M.F. Percent | M.S.N.F. Percent | T.S. Percent |
| --- | --- | --- | --- | --- |
| Honey | 66.3362 | | | 53.998 |
| Conc. Milk and Cream | 11.4264 | 2.107 | 1.906 | 4.013 |
| Dried Corn Syrup | 11.074 | | | 10.576 |
| Dextrose (hydrate) | 10.6142 | | | 9.190 |
| Cinnamon | 0.5488 | | | 0.548 |
| Antioxidant (Tenox 2) | 0.0004 | | | |
| Total | 100.0000 | 2.107 | 1.906 | 78.325 |

The foregoing products have a storage life at 40° F. of at least six to nine months.

Example 2

FORMULATION OF BASIC HONEYBUTTER MIXTURE

| Ingredient | Comp. Percent | M.F. Percent | M.S.N.F. Percent | T.S. Percent |
| --- | --- | --- | --- | --- |
| Honey (81.4% T.S.) | 67.69 | | | 55.10 |
| Conc. Milk and Cream | 11.9196 | 2.15 | 1.945 | 4.095 |
| Dried Corn Syrup | 11.60 | | | 11.078 |
| Dextrose | 8.79 | | | 8.043 |
| Antioxidant (Tenox 2) | 0.0004 | | | |
| Total | 100.0000 | 2.15 | 1.945 | 78.316 |

FORMULATION OF DEXTROSE SEED MIXTURE
[Formulated as for Example 1]

BLEND OF SEED AND BASIC MIX
[Final product is composed of 98% basic honeybutter mixture and 2% of the dextrose seed mixture]

FINAL COMPOSITION OF HONEYBUTTER

| Ingredient | Comp. Percent | M.F. Percent | M.S.N.F. Percent | T.S. Percent |
| --- | --- | --- | --- | --- |
| Honey | 66.3362 | | | 53.998 |
| Conc. Milk and Cream | 11.6812 | 2.107 | 1.906 | 4.013 |
| Dried Corn Syrup | 11.368 | | | 10.856 |
| Dextrose | 10.6142 | | | 9.190 |
| Antioxidant (Tenox 2) | 0.0004 | | | |
| Total | 100.0000 | 2.107 | 1.906 | 78.057 |

The foregoing examples are formulated according to the following procedures:

(A) PREPARATION OF BASIC HONEYBUTTER MIXTURE (1) Warm approximately one pint of the dairy ingredient mixture to 100–110° F. and stir in antioxidant.

(2) Reincorporate this mixture with remaining dairy ingredient and add with the honey and water to a pasteurizer.

(3) While heating and agitating the pasteurizer contents, blend in the dry ingredients. Heating with hot water is preferred to the use of direct steam to prevent localized overheating.

(4) Slowly raise honeybutter temperature to 165° F. and hold for 20 minutes using constant but moderate agitation.

(5) At the end of the heating period, cool product to temperature below 140° F. and homogenize at 1,000 lbs. pressure (single stage only). To minimize air incorporation, and to insure effective homogenization, a centrifugal or preferably a bypassing head, positive pump should be employed to move hot honeybutter mixtures from pasteurizer to homogenizer.

(6) Cool honeybutter in chiller (ice cream freezer) to 54–57°F. to minimize air incorporation, direct product into chiller at low point and exit from highest point. It may also be necessary to bypass and recirculate a portion of the product to attain this temperature.

(7) Transfer chilled product to crystallizer, which should provide slow, side scraping agitation and cooling. Start slow agitation and introduce coolant to jacket to maintain 54–57° F. temperature. This unseeded mixture may be held for 24 hours prior to seeding if necessary.

(B) PREPARATION OF SEED (1) Combine granular dextrose with required amount of water. Mixture will become quite viscous and doughy but will thin out rapidly as the dextrose dissolves.

(2) Heat dextrose-water mixture to approximately 140° F. and maintain temperature until all dextrose dissolves. Moderate agitation helps to speed solution. Do not overheat because of the danger of browning. Hot water is the preferred heating medium. This step should require approximately an hour.

(3) Cool dextrose solution to 60° F. It may be stored at this temperature for 1 or 2 hours prior to starting it to crystallize, if the process schedule requires it.

(4) Approximately 60 to 90 minutes before the time to seed the basic honeybutter mixture, add to the 60° F. dextrose solution enough dextrose crystals (200 mesh) to make the solution slightly milky or turbid in appearance. Agitate moderately for the entire period.

(5) The dextrose will crystallize with the solution becoming progressively more milky in appearance and increasing in viscosity. To facilitate its incorporation into the 60° F. honeybutter, it should be added while it still has slight fluidity. If mixture becomes too heavy before seeding time, it may be diluted with the cooled honeybutter going into the crystallizing tank.

(C) SEEDING AND CRYSTALLIZATION (1) To chilled mixture in crystallizer, add dextrose seed slurry. Seeding should be initiated approximately 24 hours prior to intended time of packaging.

(2) Agitate seeded mixture vigorously for a short time (several minutes) to insure uniform dispersal of the seed throughout the entire mass. Thereafter adjust agitator to slowest speed for duration of crystallizing period.

(3) Adjust flow of coolant to maintain 54–57° F. crystallizing temperature.

(4) After 24 hours crystallization, the honeybutter will be quite viscous (viscosity in excess of 100,000 c.p.s.) but will flow. It can be packaged using conventional piston filling equipment such as Lincoln, etc.

(5) Interrupting the agitation-crystallizing process prior to 24 hours may result in undue waxiness, on the other hand, agitation beyond 24 hours generally results in a sticky, taffy-like consistency.

(6) If it is impractical to package at the end of the 24 hour crystallizing period, the honeybutter may be allowed to stand without agitation for several hours without affecting the consistency appreciably.

The honeybutter of the present invention includes dried corn syrup in the amount of 5–15% by weight of the final product, preferably about 11–12% by weight of the final product. Also included in dextrose in the amount of 5–15%, preferably 8–10% by weight of the final product. The dried corn syrup and dextrose blend provide a number of unexpected advantages in the final product and are used to make the honey flavor more mild without changing the sweetness or increasing the dextrose level to an undesirable point. In a honeybutter product, there is an optimum dextrose level beyond which the honeybutter has too much crystal structure and is of much reduced spreadability. Honey has a very pronounced flavor which is objectionable to some people. If the amount of honey in a honeybutter product is reduced to lessen the pronounced flavor, the additional dextrose necessary produces the aforementioned undesirable crystal structure. However, by adding dried corn syrup, the dextrose level can be maintained and the desirable final total solids of the product are maintained at the proper level for optimum spreadability and storage. The dried corn syrup, which includes dextrose and other higher sugars, maintains the sweetness of the product while making the honey flavor less pronounced and allowing the dextrose level to be maintained at the desired point.

The final product can comprise from 60–70% honey, from 2–20% milk solids, including 1–10% milk fat or other suitable fat such as vegetable or animal fat, and 10–30% water soluble sugar solids, preferably a mixture of dried corn syrup and dextrose, with the total solids in the product being about 68–82%. The preferred product includes about 5–15% dried corn syrup and 5–15% dextrose and includes about 78–79% total solids. The optimum product includes about 55% honey solids, about 4% milk solids, about 11% dried corn syrup, about 8% dextrose, and about 2% milk fat.

When the final product is a cinnamon flavored honeybutter, about 0.6% cinnamon solids are added. Unexpectedly, this allows the total solids in the product to be raised to a higher level than in the unflavored honeybutter product. The reason for this is not known at the present time.

The honey which is incorporated into all of the honeybutter products preferably includes about 81–85% honey solids.

Many of the steps in the process can be varied from the optimum conditions set forth hereinbefore. However, it is imperative that the pasteurized homogenized product be chilled to a temperature no higher than 60° F. and from preferably 54–57° F. before the seed crystals are added. It also is important that the product be agitated during the addition of the said crystals and thereafter during the crystallization time, while the temperature is maintained below 60° F. The optimum time for crystallization is about 24 hours, although from about 22–28 or 32 hours is satisfactory. If the product is not agitated and allowed to crystallize for at least 22 hours, insufficient crystallization will occur and further crystallization occurs after packaging, so that the final product in the package sets up to a hard, waxy type structure. If the crystallization is allowed to proceed for more than 32 hours, the final product has a taffy-like consistency.

It also is important that the seed crystal added be in the nature of an actively growing seed mixture at the time it is added to the honey and fat product. If the seed crystals are not actively growing, there will not be enough crystallization in the final honeybutter to produce the desired product.

The present process is of a continuous and mechanical nature and, with few manual operations, accomplishes in about 24 hours what used to require a 14-day crystallization time and results in a more uniform spreadable final product. The process may be started, all phases carried out mechanically and finished product packaged in 24–30 hours.

What is claimed is:

1. A spreadable, solid food product in which the dextrose is crystallized consisting essentially of honey, milk, sugar and water, the solids of which comprise 50–60% honey solids, 2–20% milk solids including 1–10% fat selected from the group consisting of milk fat, other animal fat and vegetable fat, 5–15% added dextrose and 5–15% corn syrup solids, the total solids in said product being about 68–82%.

2. The product of claim 1 wherein the fat is milk fat.

3. The product of claim 1 including cinnamon flavoring.

4. The product of claim 1 including an antioxidant.

5. The product of claim 1 wherein the honey includes about 81–85% total solids.

6. The product of claim 5 wherein the total solids is about 78–79%.

7. The product of claim 6 wherein the total solids includes about 55% honey solids, about 4% milk solids including about 2% milk fat, 11% dried corn syrup and about 8% dextrose.

8. The product of claim 7 including about 0.6% cinnamon solids.

9. A process of making honeybutter including the steps of combining fluid honey, milk solids, an edible vegetable or animal fat, and added water soluble dextrose-supplying sugar material, pasteurizing the mixture, homogenizing the mixture, cooling the pasteurized and homogenized product to below about 60° F., crystallized by adding seed crystals and agitating, and maintaining the temperature below about 60° F. during crystallization.

10. The process of claim 9 wherein the dextrose-supplying sugar material is a mixture of dextrose and corn syrup solids.

11. The process of claim 9 wherein the seed crystals are a slurry of growing dextrose crystals.

12. The process of claim 9 wherein the product with the seed crystals added is agitated for about 20–32 hours at a temperature below 60° F., and packaged.

13. The process of claim 9 wherein the time is about 24 hours and the temperature is about 54–57° F.

References Cited

UNITED STATES PATENTS 1,987,893   1/1935   Dyce _____ 99—146

FOREIGN PATENTS 318,388   9/1929   Great Britain.
475,020   11/1937   Great Britain.

OTHER REFERENCES

The Joy of Cooking, The Bobbs-Merrill Co. Inc., New York 1953, p. 22, 1953.

A. LOUIS MONACELL, *Primary Examiner.*

RAYMOND N. JONES, *Examiner.*

J. M. HUNTER, *Assistant Examiner.*